July 29, 1952
L. B. LINDEMUTH
2,605,179
FUSED ORE AGGLOMERATES
Filed Nov. 16, 1949
4 Sheets-Sheet 1
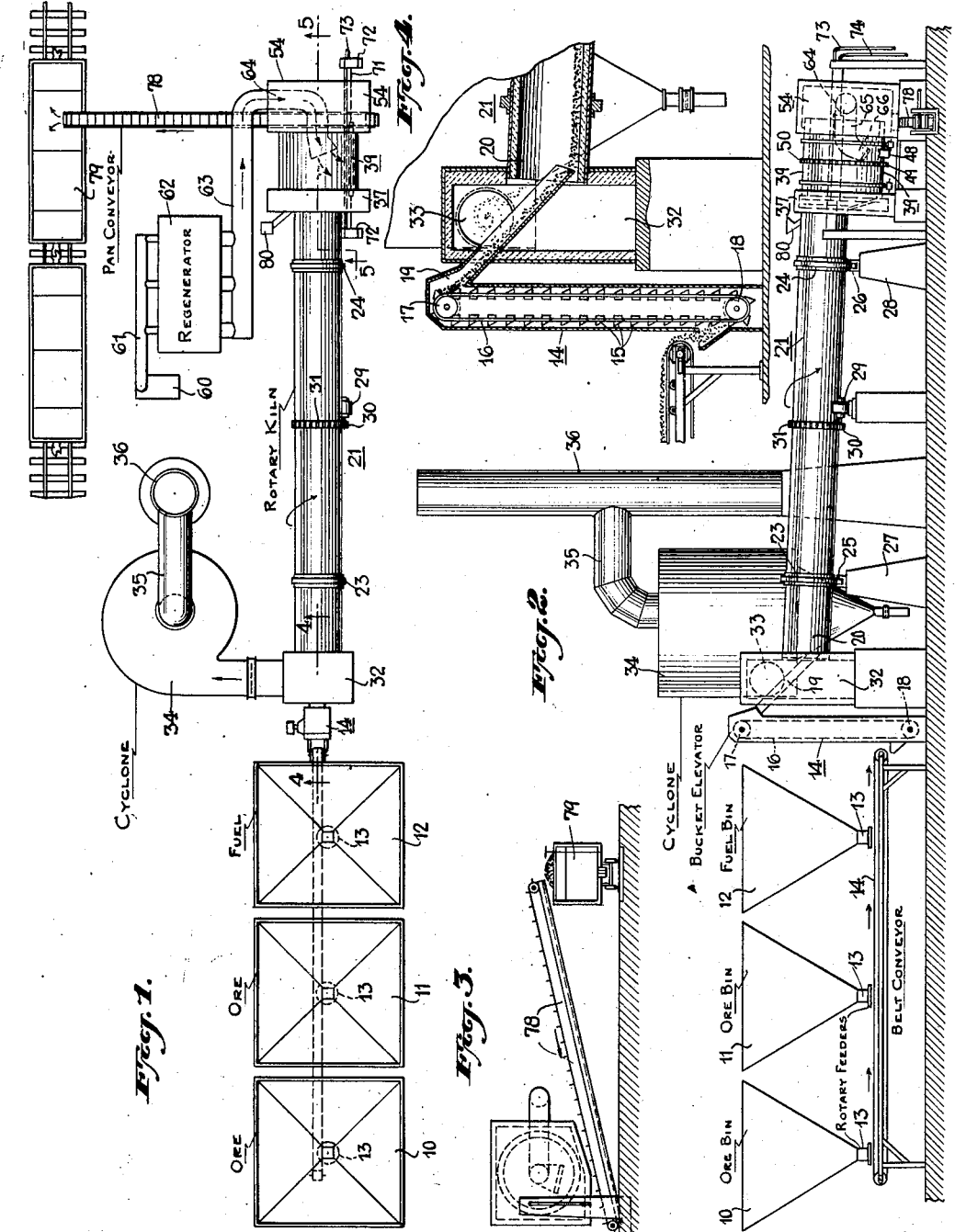
INVENTOR.
Lewis B. Lindemuth.
BY Ward Crosby & Neal.
ATTORNEYS.

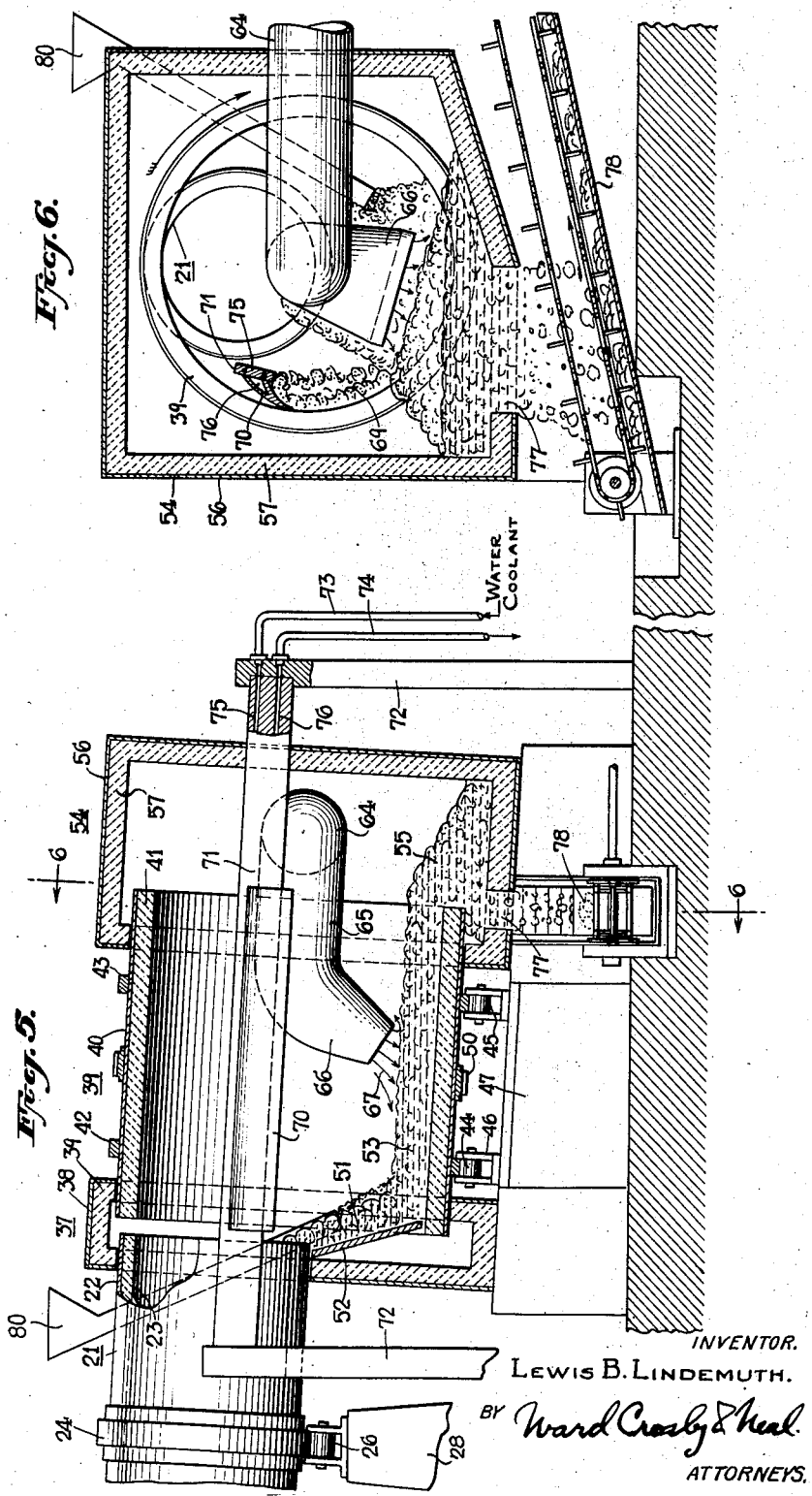

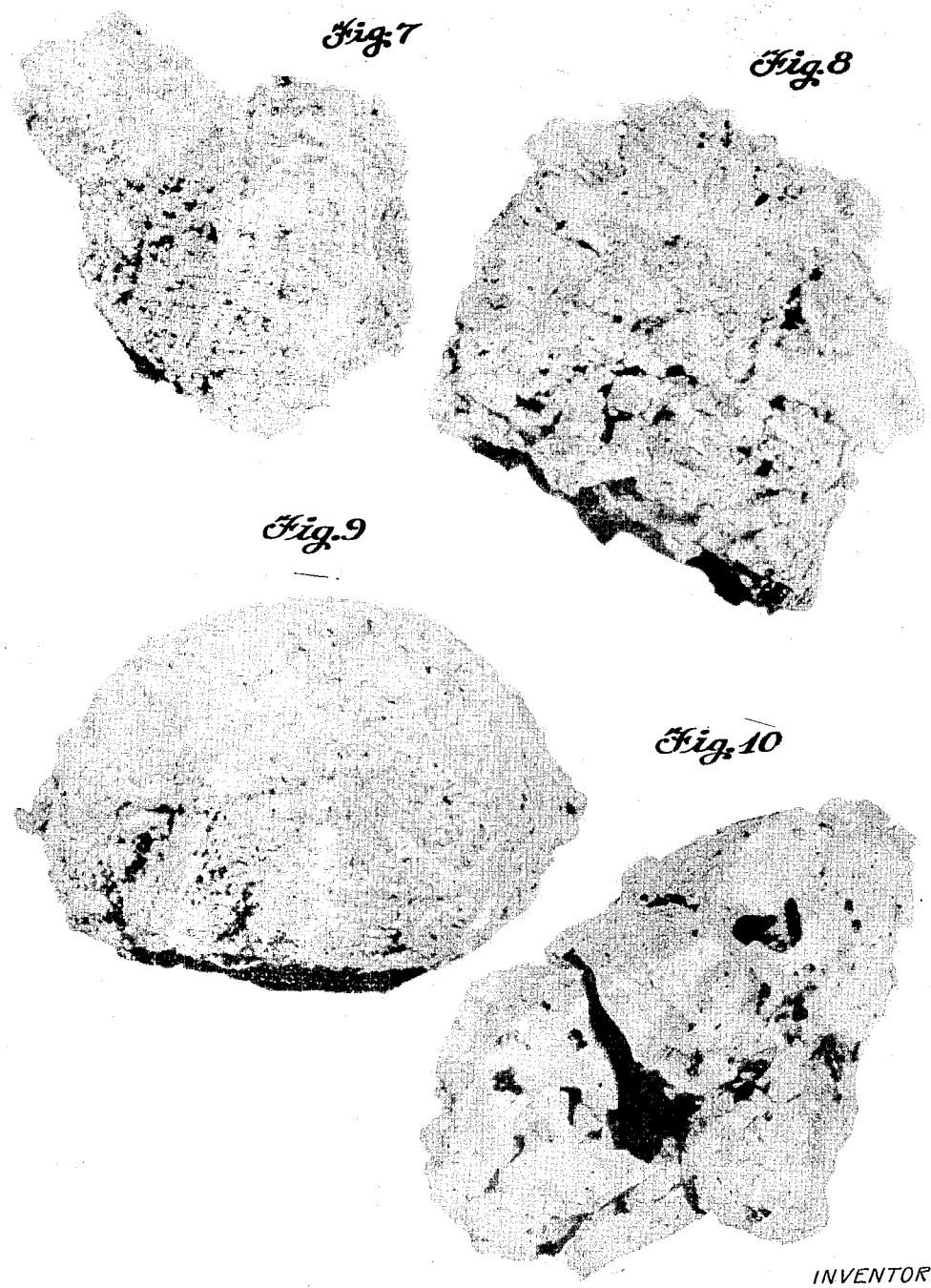

July 29, 1952    L. B. LINDEMUTH    2,605,179
FUSED ORE AGGLOMERATES

Filed Nov. 16, 1949    4 Sheets-Sheet 4

INVENTOR.
LEWIS B. LINDEMUTH.
BY Ward Crosby & Neal.
ATTORNEYS.

Patented July 29, 1952

2,605,179

UNITED STATES PATENT OFFICE 2,605,179

FUSED ORE AGGLOMERATES

Lewis B. Lindemuth, Port Washington, N. Y., assignor, by mesne assignments, to Great Lakes Steel Corporation, Wilmington, Del., a corporation of Delaware Application November 16, 1949, Serial No. 127,543

2 Claims. (Cl. 75—5)

This invention pertains to synthetic ores and their production comprising fused agglomerates of ore fines or metal oxides and metal of the ores or oxides in the metallic state in controlled amounts, and pertains more particularly to fused iron ore agglomerates derived from ore fines, blast furnace flue dust or the like, by fusion and partial reduction thereof, in a rotary furnace of special construction and operation, such as to produce a fused ore agglomerate having an apparent density and a lump or particle size which are controllable in accordance with the furnace operation, and which result in an agglomerate suitable for charging into an open hearth or blast furnace.

The term "fused ore agglomerate" is employed herein to differentiate the product of the present invention from down draft sinter and nodules obtained in accordance with certain prior art practices, and also because in accordance with the invention described herein the ore fines, flue dust or the like, are actually fused, and may in fact be produced in a completely liquid or molten state and cast into molds of any desired size and shape. In addition the fused or agglomerate of the invention differs fundamentally from down draft sinter and nodules and equivalent synthetic or beneficiated ore products of the prior art, in that it comprises a relatively solid, dense and hard fused admixture of ore and metal of the ore reduced to the metallic state, in massive, lump or cast form of a controllable particle size; whereas the prior art products referred to constitute fritted masses of the ore fines, the individual particles of which are bonded together merely by surface fusion thereof, into a friable mass of little mechanical strength, characterized by extreme porosity and low density, and in which there is no reduction of the ore to the metallic state.

For example, the fused iron ore agglomerate in accordance with the invention will contain about 5 to 75% by weight of iron reduced to the metallic state in fused admixture with the iron ore, and will have an apparent density, as compared to water, ranging upwards of 3, and ordinarily about 3½ to 4. As stated the lump or particle size in which the agglomerate is produced, is controllable, and may range from about ⅛ inch to 4 inches or more in the least dimension, depending on the use intended, a particle size ranging from about ⅛ inch to 1 inch being suitable for use as blast furnace ore, whereas for the open hearth furnace, a particle size ranging from about 1 inch to 4 inches is appropriate for charge ore, while that in excess of about 4 inches is suitable for feed ore. In contrast to this, the down draft sinter product of the prior art will have a maximum apparent density of only about 2, which is unsatisfactory for charging into the open hearth furnace by reason of its lightness in weight causing it to float on the molten metal in the furnace. Also by reason of its fritted and friable state, it is easily broken up and reduced to a relatively powdered condition in handling.

This application is a continuation in part of my co-pending applications, Serial Nos. 13,493, now abandoned; 13,494 and 13,495, now abandoned, filed March 6, 1948; and Serial No. 90,969, filed May 2, 1949.

Fused iron ore agglomerates in accordance with the invention may be produced, by the procedure described herein, from such starting materials as Lake ore fines in various grades, blast furnace flue dust, gas washer sludge or sump dust, magnetic iron ore concentrates, iron pyrite cinder, aniline sludge, etc., including materials of this character having such a fineness that 60% or more thereof will pass through a 325 mesh screen.

The preferred procedure for producing the synthetic fused ore agglomerates of the invention, may be briefly outlined as follows, as employed by way of illustrative example but without limitation thereto, in the production of fused iron ore agglomerates.

The starting materials are, for example, iron ore in powdered form, together with carbon in the form of anthracite coal, crushed coke, coke breeze, etc., which are mixed in the proportion of about 10% to 20% carbon to the weight of the ore. The starting materials may range in particle size from about ¾" down to about 325 mesh or even less.

The aforesaid ingredients are mixed, for example, by discharging from hoppers containing the ore and carbon respectively onto a traveling conveyor belt. The belt conveyor discharges into a bucket elevator which elevates and discharges the admixed material into a chute down which it passes by gravity into a rotary furnace or kiln which is downwardly inclined from the charging to the discharge end. The charge is fed thence gradually down the furnace under the combined action of gravity and rotation thereof, and, when within a few feet of the discharge end, a blast of air, preheated to approximately 1200° F. to 1500° F., preferably about 1300° F., is directed downwardly onto the preheated charge at a sufficient pressure to agitate the material through the depth of its bed. The preheated air striking the preheated ore and fuel generates almost instantly, a temperature sufficiently high to ignite the charge and fuse the ore, with partial reduction thereof to the metallic state, to an extent dependent on the amount of fuel employed, thus to form the agglomerate. Meantime the heated gases including products of combustion, passing up the furnace preheat the ore and fuel as the latter moves down the furnace, the gases escaping through the stack at the furnace entrance, at a temperature of about 500° F.

The material, when it reaches the ignition point in the furnace, must be at a predetermined temperature of approximately 1800° F. and this is determined for various grades of ore by the speed of rotation of the furnace, which is adjustable. The hot air blast is introduced into the furnace through an inlet pipe which enters the furnace axially through the discharge end and which a short distance therefrom is turned downwardly in order to inject the air onto and through the furnace charge lying on the bottom of the kiln. It is at this point that combustion occurs. The combustion temperature ranges from about 2800° F. to 2900° F.

This fuses the charge and causes it to adhere to the furnace wall so that it rides up on the furnace wall during rotation thereof. Adjacent to, and parallel to the lining of the furnace wall, there is stationarily mounted a water-cooled knife edge which cuts from the furnace lining the fused agglomerate adhering thereto. The lumps or particles of the fused agglomerate thus scraped from the furnace lining by the cutter bar fall back into the bed of the ore and agglomerate lying on the base of the furnace, thereby agglomerating the fused product into sizes suitable for open hearth or blast furnace use, depending on the operation of the furnace as described below.

Depending on the amount carbonaceous fuel employed, the resulting fused ore agglomerate may be controlled in the furnace to provide a resulting composition which ranges anywhere from substantially 100% pure iron oxide and substantially no metallic iron, up to about 75% or more by weight of metallic iron and the balance iron oxide plus the residual impurities present in the original ore and also those introduced into the agglomerate from the fuel. Metallic iron results from an excess of fuel and varies in amount therewith. The fused agglomerate of the invention will, however, ordinarily contain a minimum of about 5 to 10% metallic iron for reasons explained below, a preferred range being about 30 to 50%. The residual impurities referred to, include such elements as silica, alumina, magnesia, lime, phosphorus, etc., ranging in amounts up to about 10% to 15% by weight of the charged ore. Such impurities as sulphur, zinc, and arsenic present in the original ore or fuel, are removed by oxidation in the combustion zone of the furnace and pass off through the furnace stack in gaseous form.

In the production of fused iron ore agglomerates in the manner aforesaid, it is desirable, although not essential, that the rotation in the furnace be such as to produce a fused agglomerate containing on the order of about 30% to 50% metallic iron by weight of the resulting product, since a fused product containing a higher iron content is difficult to handle in the furnace by the agglomerating procedure referred to, due to tenacious adherence of the fused product to the furnace wall rendering it difficult for the cutter bar to cut the same away from the wall; and also because an agglomerate containing more than approximately 50% metallic iron tends to re-oxidize in the air or in an open hearth furnace.

An alternative procedure, to that above described, for producing a fused ore agglomerate in accordance with the invention, is to employ a sufficient excess of fuel to reduce the fused agglomerate to a molten state whereby it leaves the kiln in liquid form from whence it is run out, cast and solidified in successive pans of a pan conveyor into castings of the size and shape of the pans employed.

In the fused iron ore agglomerate, in accordance with the invention, the iron oxide present in the agglomerate protects the metallic iron content therein against oxidation and also against oxidation in the open hearth furnace, in the latter case because the iron oxide of the agglomerate supplies the necessary oxygen for oxidizing the carbon, silicon, manganese, phosphorus, etc., in the open hearth refining process, and hence does not produce any substantial oxidizing action on the metallic iron embedded in the agglomerate.

Irrespective of whether the ore is fused and agglomerated in the furnace by means of the cutter bar and collected in a scraper conveyor, or is completely liquified and cast in a pan conveyor, it is then conveyed over a series of screens to separate and segregate the end product into particles, graduated according to size. As above stated, a particle size of over 4" is suitable for use as open hearth feed ore; that between 4" and 1" is suitable for open hearth charge ore; that between 1" and ⅛" is suitable as blast furnace ore; whereas particles under ⅛" are returned as fines to the charging end of the furnace for further agglomeration. Particles under ⅛" do not ordinarily result from normal furnace operation, but sometimes are produced as a result of interruption in the process, caused by stoppages.

The fused iron ore agglomerate produced in accordance with the invention can be employed in the open hearth furnace for producing refined steel, and can also be charged into a blast furnace for producing pig iron. In the latter case it represents an economy in blast furnace fuel requirements since in the agglomerate the iron ore is already partially reduced.

An outstanding advantage of the fused ore agglomerate produced in accordance with the invention, is that it provides a means of converting fine ores, i. e., pulverulent or powdery ores or metal oxides into a usable form for charging into a furnace, such as the blast or open hearth furnace. It similarly provides a means of converting blast furnace fines or flue dust into a suitable form for re-charging into the furnace, and thus represents an economy in blast furnace operation.

When fuel is added to the starting materials in excess of that required for fusing, the end product consists, as stated, of a fused agglomerate of metallic iron and iron oxide in proportions depending on the excess of fuel so utilized. In this way the iron content of the fused product resulting from the use of ores or material normally bearing from about 50% to 55% of iron can be increased to about 60 to 65% thereof or more.

In contrast to the process and product of the invention as above described, in down draft sintering and nodulizing, a wetter-down layer of ore fines and carbonaceous fuel, such as coke breeze, deposited in a uniform layer on a chain grate conveyor belt, is conveyed past an intense oil or gas flame, to ignite the carbonaceous fuel, air being drawn through the charge as the fuel burns to form the sintered and nodulized end product. The oxidizing action of this air blast prevents any reduction of the ore to the metallic state, and would in fact oxidize any metallic iron present. Accordingly the pulverulent particles comprising the ore fines or oxides, are merely fritted loosely together by incipient surface fusion thereof, to produce the extremely porous and friable ore mass of low apparent density aforesaid.

Fused ore agglomerates in accordance with the invention which are suitable for charging into open hearth or blast furnaces, as produced from various types of iron bearing raw materials, have been found to depend upon control over the following factors: (1) Temperature of the preheat charge when it reaches the point where the air blast strikes it. (2) Reasonable uniformity of blast temperature. The temperature can range from about 1250° F. to 1500° F. but should be maintained reasonably constant at any temperature within this range. (3) A blast pressure should be employed that is sufficient to agitate the charge within the kiln to its complete depth. The required pressure thus depends on the depth of the charge and upon the nature of the ore being processed. Heavy magnetites require a heavier pressure and gas washer sludges the lowest of the raw materials above mentioned, due to differences in bulk density. (4) The blast volume employed which, in turn depends upon the fuel used, and which averages about 100 cubic feet per pound of fixed carbon in the fuel, this volume being measured under atmospheric conditions. (5) The preheat temperature and the requisite particle size of the end product, both of which are controlled by varying the rate of speed of the furnace. A relatively high speed furnace rotation conveys the material through the kiln at a lower preheat temperature and thus results in a smaller particle size of end product; while a low rotary furnace speed has the opposite effect.

In order to overcome this two-fold influence of rotary speed of kiln on both preheat temperature and particle size of the agglomerate, a furnace or kiln in two sections of different diameters, independently driven, is employed in accordance with the preferred furnace construction as described below for producing the fused ore agglomerate of the invention. This type of construction permits of regulation of the preheat temperature without affecting the particle size of the agglomerate, this being a most important factor in producing agglomerates in accordance with the invention, since different types of ores possess different degrees of refractoriness and require different preheat temperatures.

A further important reason for utilizing the double kiln construction for producing the fused ore agglomerate of the invention, is that in a rotary kiln, material segregates according to particle size and specific gravity. Fuel is generally larger in particle size than the ore or other fines being processed and of less weight, and, with certain grades of materials, the fuel will segregate toward the top and will not be sufficiently admixed with the ore or other raw material fines for best economy and uniform preheat. By causing the ore and fuel to fall from a preheating furnace section of smaller diameter into a high temperature reaction section of larger diameter, these two components are remixed before passing under the hot air blast.

Other advantages of the double kiln construction in producing the fused agglomerate of the invention are that the water-cooled knife edge passing through the reaction section, may be supported at both ends instead of cantilevered; also air, oxygen or other gases may be introduced at the junction of the preheating and reaction sections, at times when elimination of certain oxidizable impurities is desired on a larger scale than normally encountered. Also, additional fuel may be introduced at the junction, when, in the event of delays, the preheat temperature falls below that required or when chemicals for any special purpose should be added at this juncture.

Referring to the drawings, Figure 1 is a plan view, and Figure 2, a view in side elevation, of a preferred form of the rotary furnace and appurtenant apparatus assembly, for producing fused ore agglomerates in accordance with the invention.

Figure 3 is a view in end elevation of the discharge end of the furnace as viewed from the right in Fig. 2, and showing a conveyor for transferring the agglomerate discharged from the furnace onto a flat car or the like.

Figure 4 is an enlarged sectional detail as taken at 4—4 of Fig. 1.

Figure 5 is an enlarged longitudinal view, partially in section, of the discharge end of the furnace as taken at 5—5 of Fig. 1; while Figure 6 is an enlarged transverse section of the discharge end of the furnace as taken at 6—6 of Fig. 5.

Figure 11:
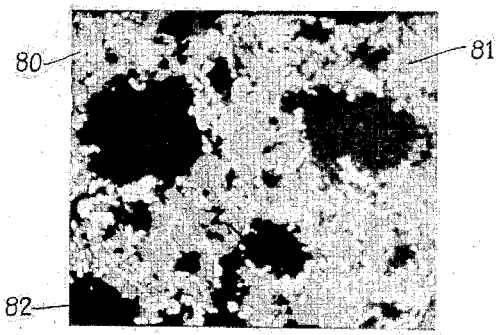

Figures 7 to 10 inclusive are views in full size, of fused ore agglomerates in accordance with the invention derived from various ore fines as described below; while Figures 11 to 13 inclusive are sectional views through such agglomerates, at a magnification of about 50 diameters.

Referring to Figs. 1 and 2, the ore or other fines to be agglomerated are loaded into hoppers, such as 10, 11, while the carbonaceous fuel is loaded into a hopper such as 12, these materials being discharged thence through rotary feeders provided in the bases of the hoppers, as at 13, onto a continuously driven conveyor belt 14, from whence the admixed raw materials are discharged by the conveyor belt into a bucket elevator 14, consisting of a series of buckets, as at 15, Fig. 4, mounted upon a chain 16, which passes at its opposite ends about driven and idler sprockets, as at 17, 18, which elevate the admixed raw materials, and discharge the same into a chute 19, from whence they pass by gravity into the charging end 20 of the preheating section, shown generally at 21, of a rotary kiln or furnace.

Referring momentarily to Fig. 5, this preheating section 21 of the rotary kiln comprises an outer cylindrical metal sleeve 22 lined with a layer of refractory material 23. Section 21 is provided with spaced bearing rings, as at 23, 24, rotatably supported on rollers, as at 25, 26, journaled to stationary bearing members mounted on fixed supports 27, 28, and is rotatably driven by a motor 29 having keyed thereto a pinion 30 meshing with a gear ring 31, the latter circumscribing and secured to the furnace section 21.

The upper end of the preheating furnace section 21, extends into a flue 32 having an outlet at 33 into a cyclone dust separator 34, the output of which is piped, as at 35, to an exhaust stack 36. Referring more particularly to Fig. 5, the lower end of the pre-heating furnace section 21, extends into a stationary sleeve-like coupling member 37, consisting of an outer sheet metal housing 38, and a refractory lining 39. Into the opposite end of coupling member 38, there extends the upper end of a larger diameter, reaction zone furnace section 39, of cylindrical configuration and likewise consisting of an outer metal housing 40 provided with a refractory lining 41. Furnace section 39 is likewise provided with spaced bearing rings, as at 42, 43, rotatably supported on rollers as at 44, 45, journaled to stationary bearing members, as at 46, mounted upon a stationary supporting structure 47. The furnace section 39 is rotatably driven independently of furnace section 21, by means of a motor 48, Fig. 2, having keyed to its shaft a pinion 49 meshing with a gear ring 50 surrounding and secured to furnace section 39.

The admixed and preheated raw materials passing through the pre-heating section 21 are discharged from the lower end thereof, under gravity, as at 51, Fig. 5, along a chute 52, of the coupling member 37, into the bottom of the reaction furnace section 39, as at 53. The lower end of the reaction furnace section 39 projects into a stationary chamber 54 into which the fused ore agglomerate produced in the reaction chamber is discharged, as at 55. The discharge chamber 54 comprises a sheet metal housing 56 provided with a refractory lining 57.

For introducing the hot air blast into the reaction chamber 39 of the furnace, air is blown by means of a rotary fan 60, Fig. 1, through piping 61 into and through an externally fired recuperator 62, preferably heated by blast furnace gas, the heated air thus produced in the recuperator, passing thence over pipe line 63, extending, as at 64, into the discharge chamber 54, and thence axially, as at 65, into the discharge end of the reaction chamber 39, and thence downwardly as at 66, Fig. 5, in the form of an outlet nozzle for directing the hot air blast downwardly as at 67, into and through the furnace charge 53 being fused and agglomerated.

As above stated, the material being agglomerated rides up along and adheres to the furnace wall in the manner shown at 69 of Fig. 6, and is cut away therefrom by means of a water-cooled knife blade 70, which extends entirely through the reaction zone 39, as shown in Fig. 5, and is mounted upon a support 71, the latter being carried at opposite ends of the furnace, on upstanding supports 72, 72. For cooling the knife blade 70, a coolant, such as cold water, is circulated through pipe lines 73, 74, connecting with ducts 75, 76, provided in the knife blade and its support 70, 71.

The fused agglomerate 55, discharged under gravity from the reaction furnace section 39 into the discharge chamber 54, discharges thence under gravity through an opening 77 in the base of the discharge chamber, on to a conveyor 78, which may be either a scraper conveyor if the agglomerate is agglomerated by means of the cutter bar, or may be a pan conveyor if the agglomerate is discharged in liquid or fluid form. The discharge conveyor 78 elevates and discharges the agglomerate onto a loading car or the like, as at 79, Fig. 3. A chute 80 extends through the coupling member or hood 37, for introducing additional fuel or other material if desired into the charge 51 being fed from the preheating furnace section 21, into the reaction chamber 39.

In a physical embodiment of the apparatus illustrated in Figs. 1 to 6, capable of treating about five hundred gross tons of ore fines per day, the rotary furnace sections 21 and 39 are inclined to the extent of about ½" to the foot for feeding the material by gravity, in conjunction with the rotation of the furnace sections. The preheat furnace section 21 is about eight feet in diameter and eighty feet in length, while the reaction furnace section 39 is about fourteen feet in diameter and fourteen feet in length. These sections are independently driven by the motors 29 and 48 geared thereto respectively, at speeds which are adjustable within the range of about ½ to 2½ revolutions per minute. The hot air blast 67 is introduced through nozzle 66, Fig. 5, at a temperature within the range of 1250° F. to 1500° F. The combustion gases from the reaction chamber 39 in passing up the preheating chamber 21 to the flue 32, and thence out through the stack 36, preheat the ore and fuel introduced into the charging end of the preheating chamber 21 to such an extent that when these materials are fed into the reaction chamber 39, the temperature thereof is about 1800° F. the speed of rotation of the preheat section being adjusted to produce this temperature. Upon striking the hot air blast 67, in the reaction chamber 39, the charge is ignited and combustion occurs at a temperature of about 2800° F. to 2900° F. the charge being ignited at a point of about four feet from the lower end of the reaction chamber 39. The rotary speed of chamber 39 is adjusted in accordance with the lump or particle size of the agglomerate desired when the agglomerate is not to be discharged in liquid condition. The period required for the materials to traverse the furnace from the inlet to the discharge ends is ordinarily on the order of about one hour.

Figures 7 to 10 inclusive, illustrate, in full size, fused ore agglomerates in accordance with the invention produced from various types of ore fines. Thus, Figure 7 illustrates an agglomerate derived from New York State magnetic concentrates containing a high percentage of titanium oxide. Figure 8 shows an agglomerate produced from Lake ore fines. Figure 9 shows an agglomerate derived from pyrite sinter. Figure 10 illustrates a completely fused agglomerate produced from a mixture of two Lake ore fines.

Figure 12:
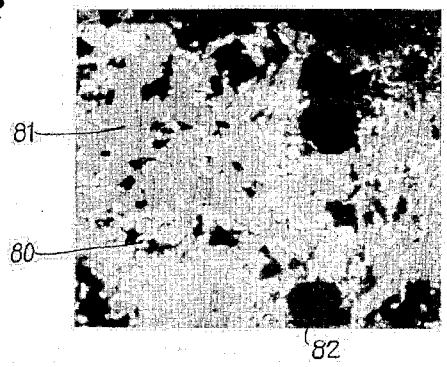
Figure 13:
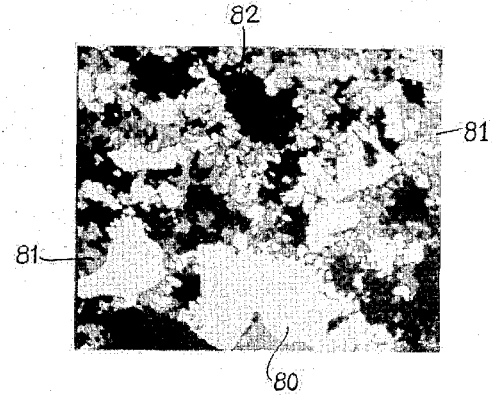

Figures 11 to 13 inclusive are enlarged sectional views at a magnification of about 50 diameter of fused ore agglomerates in accordance with the invention containing various percentages of metallic iron. In these views the white areas 80 are the metallic iron constituent, the grey areas 81 are iron oxide, while the black areas 82 are voids. It will be observed that in the agglomerates of Figs. 11 and 12, the metallic iron 80 constitutes the minor constituent and the iron oxide the major constituent, whereas in the agglomerate of Fig. 13, the metallic iron 80 is the principal constituent, the iron oxide 81 being present in a minor amount.

I claim:

1. A synthetic ore comprising a substantially non-friable, fused and porous agglomerate, in massive, lump form, produced by partial reduction of iron ore fines, and consisting of iron ore fines remaining unreduced and iron of said ore reduced in said reduction to the metallic state, said agglomerate having a particle size ranging from a minimum of about ⅛ inch to upwards of about 4 inches in least dimension, suitable for charging into open hearth and blast furnaces, the iron in metallic state of said agglomerate constituting about 5 to 75% by weight thereof, and said agglomerate having an apparent density of at least 3.

2. A synthetic ore comprising a substantially non-friable, fused and porous agglomerate, in massive, lump form, produced by partial reduction of iron ore fines, and consisting of iron ore fines remaining unreduced and iron of said ore reduced in said reduction to the metallic state, said agglomerate having a particle size ranging from a minimum of about ⅛ inch to upwards of about 4 inches in least dimension, suitable for charging into open hearth and blast furnaces, the iron in metallic state of said agglomerate constituting about 30 to 50% by weight thereof and said agglomerate having an apparent density ranging from about 3 to 4.

LEWIS B. LINDEMUTH.

REFERENCES CITED

The following references are of record in the file of this patent:

UNITED STATES PATENTS

| Number | Name | Date |
| --- | --- | --- |
| 84,053 | Ellerhausen | Nov. 17, 1868 |
| 792,449 | Pohl | June 13, 1905 |
| 1,162,927 | Osgood | Jan. 4, 1916 |
| 1,930,010 | Haswell et al. | Oct. 10, 1933 |
| 1,951,935 | Johannsen | Mar. 20, 1934 |
| 2,526,658 | Harman et al. | Oct. 24, 1950 |